E. V. LAWRENCE.
BRAKE FOR TRAILERS.
APPLICATION FILED JULY 29, 1916.

1,370,131.

Patented Mar. 1, 1921.

Inventor
Edward V. Lawrence
By his Attorney

UNITED STATES PATENT OFFICE.

EDWARD V. LAWRENCE, OF NEW YORK, N. Y.

BRAKE FOR TRAILERS.

1,370,131.     Specification of Letters Patent.     Patented Mar. 1, 1921.

Application filed July 29, 1916. Serial No. 111,978.

*To all whom it may concern:*

Be it known that I, EDWARD V. LAWRENCE, a citizen of the United States of America, and a resident of New York, county and State of New York, have invented certain new and useful Improvements in Brakes for Trailers, of which the following is a specification, reference being had to the accompanying drawings, forming a part thereof.

My invention relates to vehicle brakes and has special reference to brakes of the general class shown and described in my copending application Serial No. 109,003, filed July 13, 1916, as a continuation of application Serial No. 9504, filed February 20, 1915, which are automatically applied by the holding-back action of the tractive force, or, in other words, the force of the load pushing against the tractive force, as in going down hill or when a sudden stop is made.

One object of my invention is to provide a device of the aforesaid character that shall be particularly arranged and adapted for application to a load carrying trailer, or the trailing section of a vehicle which comprises a power or tractor section and a trailing section or semi-trailer.

My invention is capable of being applied to vehicles of various types and I intend that only such limitations be imposed as are indicated in appended claims.

In order that my invention may be thoroughly understood, I will now proceed to describe the same in the following specification, and then point out the novel features thereof in appended claims.

Referring to the drawings—

Figure 1:
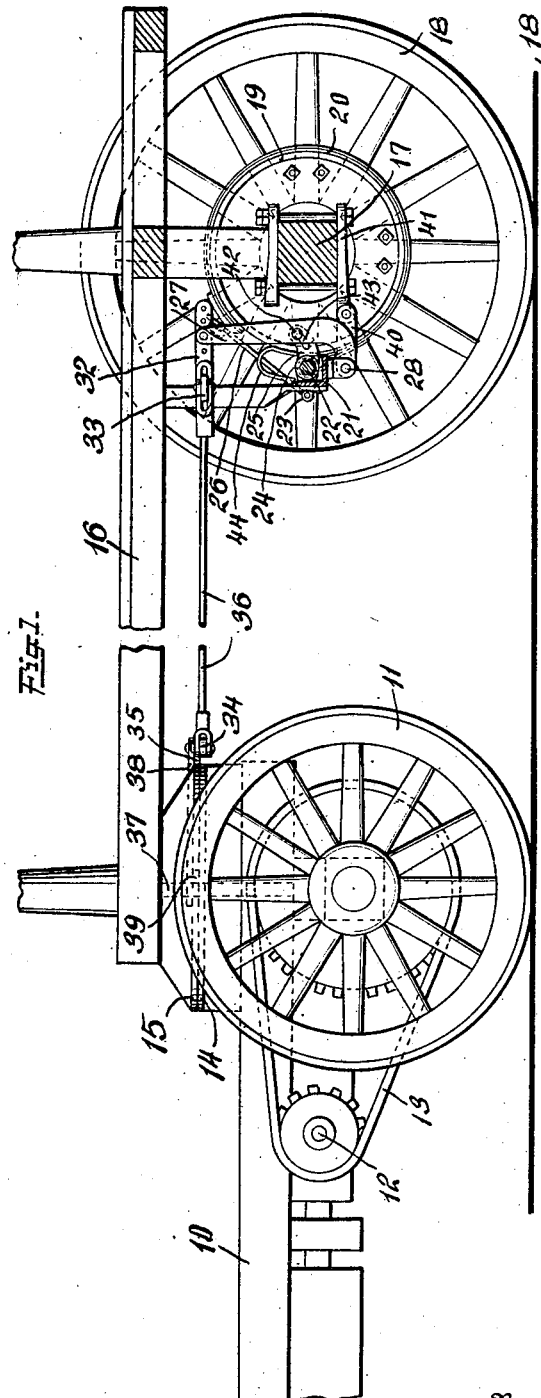
Figure 1 is an elevation, with one of the wheels and certain of the parts broken away to disclose the brake mechanism, of a vehicle having a trailing section arranged and equipped in accordance with and constituting an embodiment of my invention.
Figure 2:
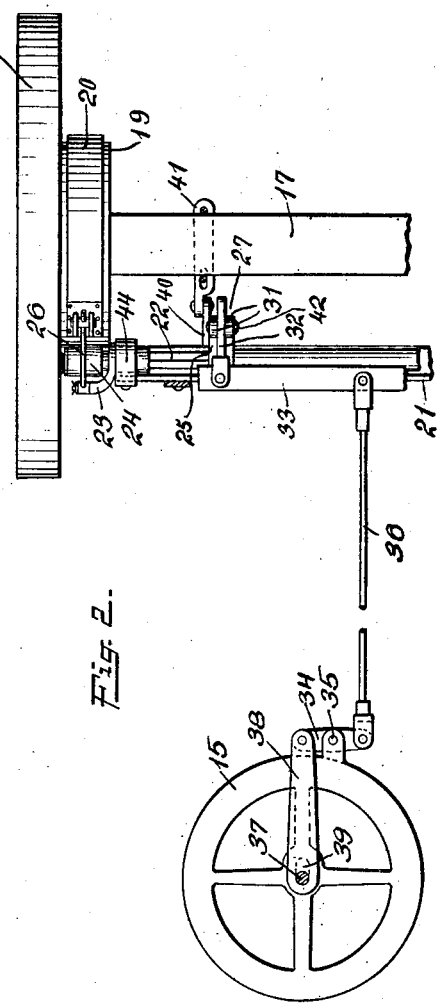
Fig. 2 is a plan view of a portion of the running gear and the brake mechanism of the vehicle shown in Fig. 1.

Referring specifically to Figs. 1 and 2,— 10 designates a tractor, 11 the driving wheels, 12 the driving shaft, and 13 a chain for establishing an operative connection between the driving shaft and the wheels.

While the tractor, as indicated, may of course comprise a four-wheel vehicle to which a trailer or semi-trailer is adapted to be coupled, my invention is not limited in this regard and the tractor may be a two-wheel motor tractor or may be a horse-drawn tractor, the method of actuating the tractor being entirely immaterial.

The tractor shown has a fifth wheel member 14 which coöperates with a fifth wheel member 15 of the trailer section which is designated 16. This trailer section or semi-trailer comprises in addition to the fifth wheel member 15, an axle 17, wheels 18, a brake drum 19 secured to each wheel, a brake band 20 coöperating with each drum, a transverse rod or bar 21, preferably of angle iron, and a brake actuating mechanism which is similar to that shown and described in my copending application Serial No. 109,003, to which reference has already been made.

The angle iron is connected to the axle 17 by clamps 41 and links 40 which are pivotally joined to lugs 28 on the angle iron.

The brake actuating mechanism comprises a sectional rocker shaft 22 and brake actuating levers each composed of sections 23—24—25 which are affixed to the rocker shaft and may be integral or independent. The lever arm 23 is connected by a link 26 to one end of the brake band 20, the opposite end of the band being secured to the lever section 24.

An actuating lever 27 is pivotally mounted at 28 on the angle iron 21 and is composed of a bifurcated or two-part arm 31 through which the lever section 25 extends.

The arm 31 at its upper end is connected by a link 32 to one end of an evener bar or equalizer 33. A lever 34 is mounted on a lug 35 of the fifth wheel section 15 and is connected by a rod or link 36 to an intermediate point in the equalizer 33.

The king pin which holds the trailer section in place on the tractor is designated 37 and a link 38 is mounted upon the fifth wheel 15 and connects the king pin to the lever 34.

The king pin is affixed to the tractor and the fifth wheel section 15 of the trailer has a slot 39 which provides a lost motion connection between the king pin and the trailer section of the vehicle.

The arrangement of parts is such that when the tractor 10 is hauling the trailer 16, the lever 34 is actuated by the king pin and link 38 so as to push back on the equalizer 33 and release the brakes, as explained hereinafter. The pivot 35 may be to one side of the center if desired, to increase the relative movement of the rod 36.

The tractive effort is exerted through the king pin in the usual manner as soon as the lost motion represented by slot 39 is taken up.

The levers 27 are swung in a clockwise direction and act upon the brake actuating levers in such a way as to release the brake bands 20 from the brake drums.

The action of the levers 27 is transmitted to the brake actuating levers by a pin 42 which extends through a slot 43 in the lever section 25 and is secured to the two-part lever arm 31.

When the trailer section 16 pushes forward against the tractor as in going down hill or in making more or less sudden stops, the fifth wheel section 15 moves forward to take up the lost motion in the slot 39 and the link 38 is consequently relatively forced backward by the king pin 37 and turns the lever 34 about the pivot 35 putting a tension on the rod 36. This tension acts through the evener or equalizer 33 and pulls forwardly on the arms 31 of the levers 27. This action causes the rocker shaft and the brake actuating levers to turn in a direction to wrap the brake bands upon the brake drums provided the wheels are rotating in a forward direction.

If, however, the wheels are rotating in a backward direction, the rocker shaft, together with the brake actuating levers, is carried upwardly within the limits determined by hanger brackets 44 and the brake cannot be set. It is therefore possible to back the vehicle without difficulty but at the same time the brakes operate automatically in holding the trailer load.

This is particularly important with heavy trailers such as are now in common use since they are likely to slip and skid on wet pavements. The brake structure illustrated is also particularly desirable because it does not depend upon a brake shoe applied to the rim of the wheel although my invention is not restricted to any particular form of brake or brake actuating mechanism.

What I claim is:

1. The combination with a tractor, a trailer, brake drums rigidly fixed relatively to the trailer wheels, brake members coöperating therewith and means dependent upon the holding back action of the tractor relative to the trailer for applying the brakes to the drums, said brake applying means being rendered inoperative by a backward rotative movement of the trailer wheels to release the brake members and permit the backing of the trailer.

2. In a vehicle, the combination with a tractor having a fifth wheel section, a trailer having a coöperating fifth wheel section, a lost motion connection between the fifth wheel sections to permit a limited forward and back movement of the trailer relative to the tractor, a brake for the trailer, a brake actuating lever mounted on the fifth wheel section of the trailer, and means for connecting the lever to the tractor.

3. The combination with a tractor, a trailer, a brake drum therefor, a brake coöperating with the drum and adapted to be automatically released to permit the backing of the trailer, a lost motion connection for coupling the trailer to the tractor, and means dependent on the taking up of the lost motion in the connection for actuating the brake.

4. The combination with a tractor, a trailer, a brake drum therefor, a brake coöperating with the drum and adapted to be automatically released to permit the backing of the trailer, a lost motion connection for coupling the trailer to the tractor, means dependent on the taking up of the lost motion in the connection for actuating the brake, and means dependent on a back rotation movement of the trailer wheels for releasing the brake.

5. In a vehicle, the combination with a tractor having a fifth wheel section, a trailer having a coöperating fifth wheel section, a lost motion connection between the fifth wheel sections to permit a limited forward and back movement of the trailer relative to the tractor, a band brake, means dependent upon said forward and back movement for setting the brake, and means automatically dependent on a backward rotative movement of the trailer wheels for releasing the band brake to permit the backing of the trailer.

6. The combination with a tractor having a fifth wheel section, a trailer having a coöperating fifth wheel section, a lost motion connection between the fifth wheel sections to permit a limited forward and back movement of the trailer relative to the tractor, brake drums secured to the trailer wheels, brake members coöperating with said drums, means for actuating the brakes, an equalizer connected to said means, and a brake actuating lever connected to the equalizing bar and to the tractor.

7. The combination with a tractor having a fifth wheel section, a trailer having a coöperating fifth wheel section, a lost motion connection between the fifth wheel sections to permit a limited forward and back movement of the trailer relative to the tractor, brake drums secured to the trailer wheels, brake members coöperating with said drums, means releasable by a backward rotation of the trailer wheels for actuating the brakes, an equalizer connected to said means, and a brake actuating lever connected to the equalizing bar and to the tractor.

8. The combination with a tractor having a fifth wheel section, a trailer having a cooperating fifth wheel section, a lost motion connection between the fifth wheel sections to permit a limited forward and back movement of the trailer relative to the tractor, brake drums secured to the trailer wheels, brake members coöperating with said drums, means for actuating the brakes, an equalizer connected to said means, and a brake actuating lever mounted on the fifth wheel section of the trailer and connected to the equalizing bar and to the tractor.

9. The combination with a tractor having a fifth wheel section, a trailer having a coöperating fifth wheel section, a lost motion connection between the fifth wheel sections to permit a limited forward and back movement of the trailer relative to the tractor, brake drums secured to the trailer wheels, brake members coöperating with said drums, means for actuating the brakes, an equalizer connected to said means, a brake actuating lever mounted on the fifth wheel section of the trailer, and a rod connecting the actuating lever, at one end, to the middle point of the equalizing bar and a link connecting the actuating lever, at the other end, to the tractor.

In witness whereof I have hereunto set my hand this 20th day of July, 1916.

EDWARD V. LAWRENCE.